United States Patent [19]

Pearlstein

[11] Patent Number: 5,691,986
[45] Date of Patent: Nov. 25, 1997

[54] METHODS AND APPARATUS FOR THE EDITING AND INSERTION OF DATA INTO AN ENCODED BITSTREAM

[75] Inventor: Larry Pearlstein, Newton, Pa.

[73] Assignee: Hitachi America, Ltd., Tarrytown, N.Y.

[21] Appl. No.: 481,581

[22] Filed: Jun. 7, 1995

[51] Int. Cl.$^6$ .................................................. H04N 7/12
[52] U.S. Cl. .................... 370/477; 370/517; 370/536; 370/916; 358/426; 375/240; 395/2.93; 348/387
[58] Field of Search ................... 370/84, 79, 100.1, 370/108, 110.1, 110.4, 94.2, 60, 111, 112, 99, 118, 464, 465, 473, 476, 477, 516, 517, 519, 535, 536, 537, 539, 542, 916, 528, 522; 348/426, 432, 385, 387, 384, 390, 388; 341/61; 358/335, 426, 430, 431, 262.1; 375/240; 395/2.91, 2.92, 2.93, 2.95

[56] References Cited

U.S. PATENT DOCUMENTS

| | | | |
|---|---|---|---|
| 5,265,095 | 11/1993 | Fiedler et al. | 370/112 |
| 5,280,479 | 1/1994 | Mary | 370/112 |
| 5,371,547 | 12/1994 | Siracuse et al. | 348/426 |
| 5,384,598 | 1/1995 | Rodriguez et al. | 348/426 |
| 5,440,542 | 8/1995 | Procter et al. | 370/112 |
| 5,461,619 | 10/1995 | Citta et al. | 370/112 |
| 5,467,132 | 11/1995 | Fazel et al. | 348/426 |
| 5,483,287 | 1/1996 | Siracusa | 348/426 |
| 5,483,534 | 1/1996 | Ohki et al. | 348/387 |
| 5,506,636 | 4/1996 | Patel | 348/725 |
| 5,506,844 | 4/1996 | Rao | 370/112 |

OTHER PUBLICATIONS

United States Advanced Television Systems Committee, Digital Television Standard For HDTV Transmission, ATSC Standard, Apr. 2, 1995.

International Standards Organization—Moving Picture Experts Group, Drafts of Recommendation H.262, ISO/IEC 13818–1,Nov. 1993.
International Standards Organization—Moving Picture Experts Group, Drafts of Recommendation H.262, ISO/IEC 13818–2,Nov. 1993.
United States Advanced Television Systems Committee, Guide to the Use of Digital Television Standard For HDTV Transmission, Apr. 12, 1995.

*Primary Examiner*—Alpus H. Hsu
*Assistant Examiner*—Seema S. Rao
*Attorney, Agent, or Firm*—Michaelson & Wallace; Michael P. Straub; Peter L. Michaelson

[57] ABSTRACT

Methods and apparatus for inserting data into an encoded data stream are disclosed. In accordance with the disclosed methods data is inserted into an encoded data stream while maintaining MPEG-2 compliance. The disclosed methods achieve data reduction required to make room for the data to be added by removing certain data elements of an encoded data stream, such as high frequency discrete cosine transform coefficients, which can be removed with minimal impact on picture quality and without disturbing the data stream's compliance with MPEG 2. In a first embodiment, data reduction to make room for the data to be inserted is performed by depacketizing the encoded data, performing a data reduction operation thereon, and then re-packetizing the encoded data. The reduced rate data stream is then multiplexed with the data to be inserted. In a second embodiment data reduction is performed by combining the contents of two or more consecutive transport data packets, e.g., the contents of a cluster of data packets, into a single data packet and by then inserting new data packets representing the data to be inserted, into the locations in the data stream corresponding to the original location of the transport data packets which were eliminated through the data reduction operation.

13 Claims, 2 Drawing Sheets

METHODS AND APPARATUS FOR THE EDITING AND INSERTION OF DATA INTO AN ENCODED BITSTREAM

FIELD OF THE INVENTION

The present invention is directed to video processing circuits and, more particularly, to methods and apparatus for processing a stream of encoded digital data to provide for the insertion of additional information such as captions and messages into the encoded data stream.

BACKGROUND OF THE INVENTION

The use of digital, as opposed to analog signals, for television broadcasts and the transmission of other types of video and audio signals has been proposed as a way of allowing improved picture quality and more efficient use of spectral bandwidth over that currently possible using analog NTSC television signals.

The International Standards Organization has set a standard for video data compression for generating a compressed digital data stream that is expected to be used for digital television. This standard is referred to as the ISO MPEG (International Standards Organization—Moving Picture Experts Group) ("MPEG") standard. In accordance with the MPEG standard, video data is encoded, e.g., compressed, using discrete cosine transform encoding and motion compensation techniques. The encoded data is arranged into variable length encoded data packets for transmission.

One version of the MPEG standard, MPEG-2, is described in the International Standards Organization—Moving Picture Experts Group, Recommendations H.222.0 and H.262, ISO/IEC 13818-1 and 13818-2, respectively, titled "Information Technology—Generic Coding Of Moving Pictures and Associated Audio" (hereinafter "the November 1994 ISO-MPEG Committee International Standards") hereby expressly incorporated by reference. Any references made in this patent application to MPEG video data is to be understood to refer to video data that complies with MPEG-2 standards as defined in the November 1994 ISO-MPEG Committee International Standards unless otherwise indicated.

The maximum data capacity of a particular transfer medium such as a cable or television channel over which a program is expected to be broadcast may be known at the time a program is encoded (compressed). However, at encoding time it is generally not known how much of that data capacity will be needed for the insertion of captioning data, emergency warning messages, program guides, broadcast interactive multimedia, or other ancillary data services that may be included with a video and/or audio broadcast, e.g, by a local television affiliate or cable television system responsible for the ultimate distribution of an encoded program to viewers. Thus, there is a data allocation problem when distributing encoded video in an environment where it is unknown a priori how many bits will ultimately be available, e.g., what portion of a channel's bandwidth, will be available for the video data of a program being encoded.

Two possible approaches to the problem of being unable to predict the amount of data that can be transmitted at the time a program is broadcast are 1) to reserve enough excess data capacity for the worst case situation in terms of the amount of data that may be added at broadcast time and 2) to drop entire transport packets at broadcast time without regard to their content to make bandwidth available for ancillary data services.

Reserving enough bandwidth for the worst case has the disadvantage of wasting data capacity in the typical case where relatively little ancillary data is to be transmitted. Also, in the cable re-broadcast scenario it may be politically infeasible for a broadcaster to reserve data bandwidth for the cable system. Thus, the first of the two possible approaches has several disadvantages.

The second possible approach discussed above, dropping entire transport packets without regard to their content in order to make bandwidth available for ancillary data services, has the disadvantage that it results in a non-compliant video bitstream and may cause extreme video artifacts.

Accordingly, there is a need for a method and apparatus capable of providing for the insertion of ancillary data into a previously encoded digital data stream of, e.g., MPEG data without the drawbacks of wasted transmission bandwidth associated with providing reserved data capacity or the reduction in video quality associated with dropping entire transport packets without regard to their content.

SUMMARY OF THE PRESENT INVENTION

The present invention is generally directed to methods and apparatus for inserting additional data into an encoded data stream prior to broadcast or rebroadcast of the data stream without the need to reserve excessive data capacity.

The present invention provides for the insertion of data into an encoded data stream, while maintaining data stream compliance with one or more standards, e.g., the MPEG-2 standard, by taking advantage of the fact that certain data elements of an encoded data stream, e.g, a portion of the data included in data packets such as high frequency DCT coefficients, can be removed with minimal impact on picture quality and without disturbing the data stream's compliance with a data transmission standard.

The actual data reduction operation performed on the data stream to achieve the required reduction in the data rate of a previously encoded program may be the same as or similar to the data reduction operations described in U.S. patent application Ser. No. 08/340,683 to achieve the data reduction required to implement long play recording modes in various video tape recorder devices. U.S. patent application Ser. No. 08/340,683 which was filed on Nov. 16, 1994 is hereby expressly incorporated by reference.

By dynamicly processing a previously encoded data stream to reduce its data rate in accordance with the present invention, it is possible to dynamically reduce the amount of data allotted to previously encoded video signals in order to allow other sources of information, such as emergency warning messages, to be transmitted over a limited bit rate broadcast channel without wasting a significant amount of bandwidth and without the reductions in picture quality associated with dropping entire data packets without regard to their content.

DETAILED DESCRIPTION

The present invention is directed to video processing circuits and, more particularly, to methods and apparatus for processing one or more streams of encoded digital data to provide for the insertion of additional information such as captions and messages into the encoded data stream(s).

Figure 1:
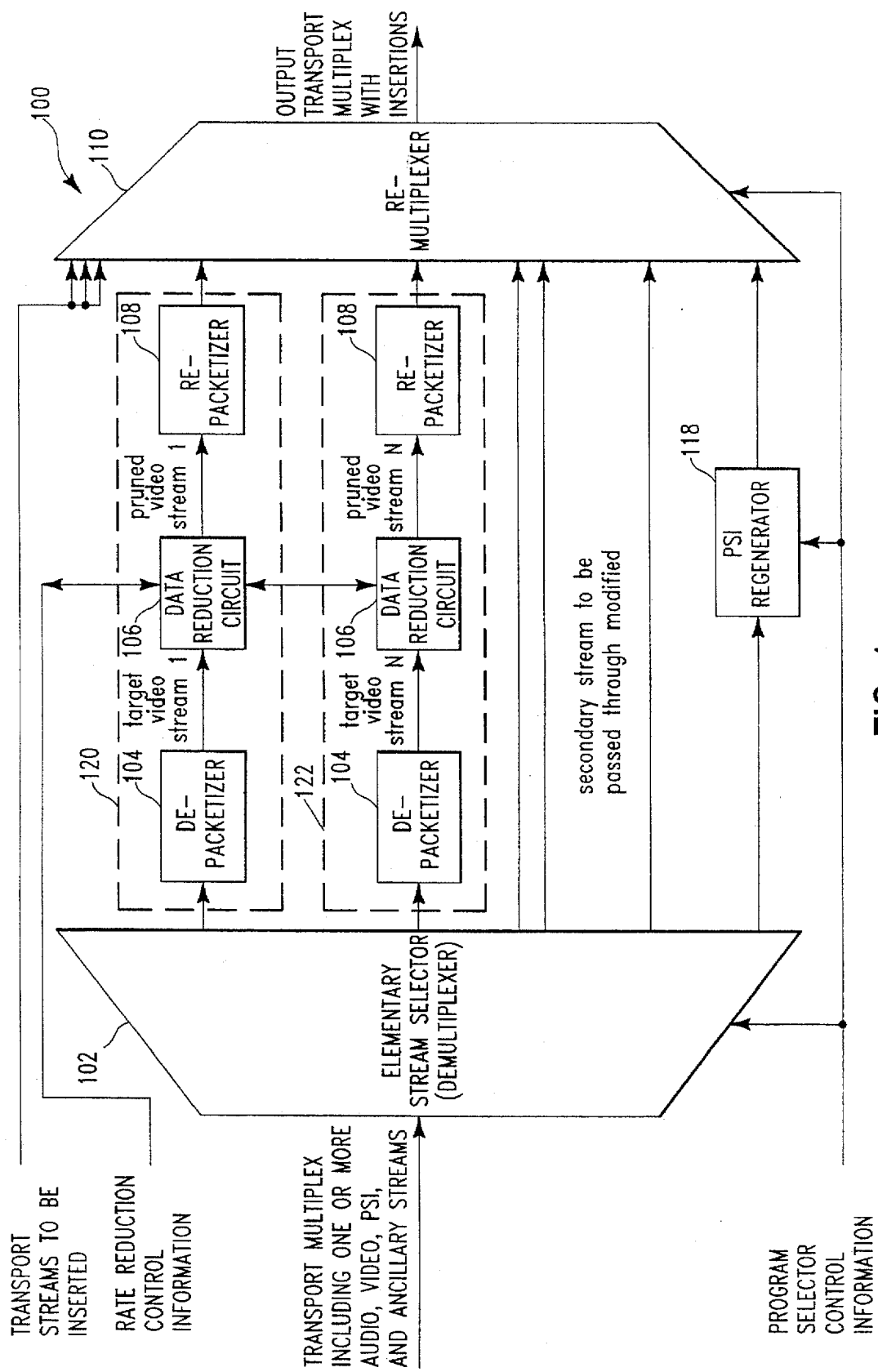
FIG. 1 illustrates a data insertion circuit implemented in accordance with a first embodiment of the present invention.

Referring now to FIG. 1 there is illustrated a data stream processing and insertion circuit 100 implemented in accordance with a first embodiment of the present invention. As illustrated the data stream processing and insertion circuit 100 comprises an elementary stream selector 102 which serves as a demultiplexer, a remultiplexer 110, a PSI regenerator circuit 118 and a plurality of first through $n^{th}$ target stream data reduction circuits 120, 122 which are responsible for reducing the data rate of a first through $n^{th}$ number of target data streams.

The PSI regenerator circuit 118 is responsible for correcting, modifying, or adding program specific information (PSI) to the multiplex as required to enable a decoder to decode the multiplex generated by the data stream processing and insertion circuit 100. The program specific information output by the PSI regenerator circuit 118 identifies individual programs including, e.g., inserted programs, within the multiplex output by the circuit 100.

Each target stream data reduction circuit 120, 122 includes a depacketizer 104, a data reduction circuit 106 and a repacketizer circuit 108 coupled together as illustrated in FIG. 1.

As illustrated in FIG. 1, the elementary stream selector circuit 102 receives as its input a transport multiplex including one or more audio, video, PSI, and ancillary streams, representing e.g., previously encoded and multiplexed television programs.

Transport streams which are to be inserted into the transport multiplex supplied to the elementary stream selector circuit 102 are supplied to one or more data stream insertion inputs of the remultiplexer 110.

In accordance with the present invention, the elementary stream selector circuit 102 is used to demultiplex the transport stream supplied thereto, into its component streams, where each stream is a single elementary stream comprising a plurality of transport packets.

A program selector signal is supplied, e.g., by an operator operating a control panel of a local broadcast system, to a control input of the elementary stream selector circuit 102. The elementary stream selector circuit 102 is responsive to the program selector signal to output only those elementary streams which represent selected program signals, with all other elementary streams supplied to the input of the elementary stream selector circuit 102 being ignored.

First through $n^{th}$ elementary streams, e.g., compressed data streams, which have been targeted for bit rate reduction, e.g., preselected streams upon which data reduction operations are performed when a reduction in the data rate of the streams output by the elementary stream selector circuit 102 is required to make room for the insertion of additional information, are each supplied to one of the first through $n^{th}$ target stream data reduction circuits 120, 122, respectively.

Each of the targeted elementary streams is depacketized by one of the depacketizers 104 and then processed by a data reduction circuit 106 to reduce the amount of data in the depacketized bitstream. The reduced rate bitstream is then repacketized by one of the repacketizer circuits 108 before being supplied to an elementary stream input of the remultiplexer 110. The data reduction circuits 106, each receive as an input signal rate reduction control information and can provide feedback information on the amount of data reduction actually performed. The data reduction circuits can be coupled together as illustrated in FIG. 1 so that the data reduction circuits 106 can communicate data reduction information between themselves thereby permitting the data reduction circuits to allocate amongst themselves how much of a reduction in the data rate of each targeted elementary stream needs to be performed to achieve the necessary overall reduction in the data rate required to provide sufficient room for the data to be inserted.

The data reduction circuits 106 can perform one or more data reduction operations to achieve the required reductions in data rates and may be implemented using circuits which are the same as or similar to the long play data processing circuits described in detail in U.S. patent application Ser. No. 08/340,683.

In accordance with the embodiment of the present invention illustrated in FIG. 1, the remultiplexer 110 combines the processed target elementary streams with the streams which are to be passed through without being subject to data reduction, the PSI, and the additional transport streams supplied to the remultiplexer 110, to be inserted into the transport multiplex. The streams which are passed through without being subject to data reduction can be delayed by the remultiplexer 110 to the extent required to maintain synchronization with the data streams upon which data reduction operations are performed. The transport multiplex output by the remultiplexer 110 includes the audio, video, PSI, and ancillary streams selected to be output as a function of the program select signal and the transport stream which were to be inserted into the transport multiplex.

In the above described manner, the data stream processing and insertion circuit 100 of the present invention which is presented with a transport multiplex and additional transport streams to be inserted produces a single transport multiplex at the desired bit rate which includes the desired streams from the source multiplex along with the additional transport streams that were to be inserted.

The operation of the data stream processing and insertion circuit 100 is straight forward in that it is possible to directly multiplex additional transport streams with elementary streams representing selected programs while achieving a output bit rate which approximates the maximum bit rate of a limited bit rate transmission channel.

Figure 2:
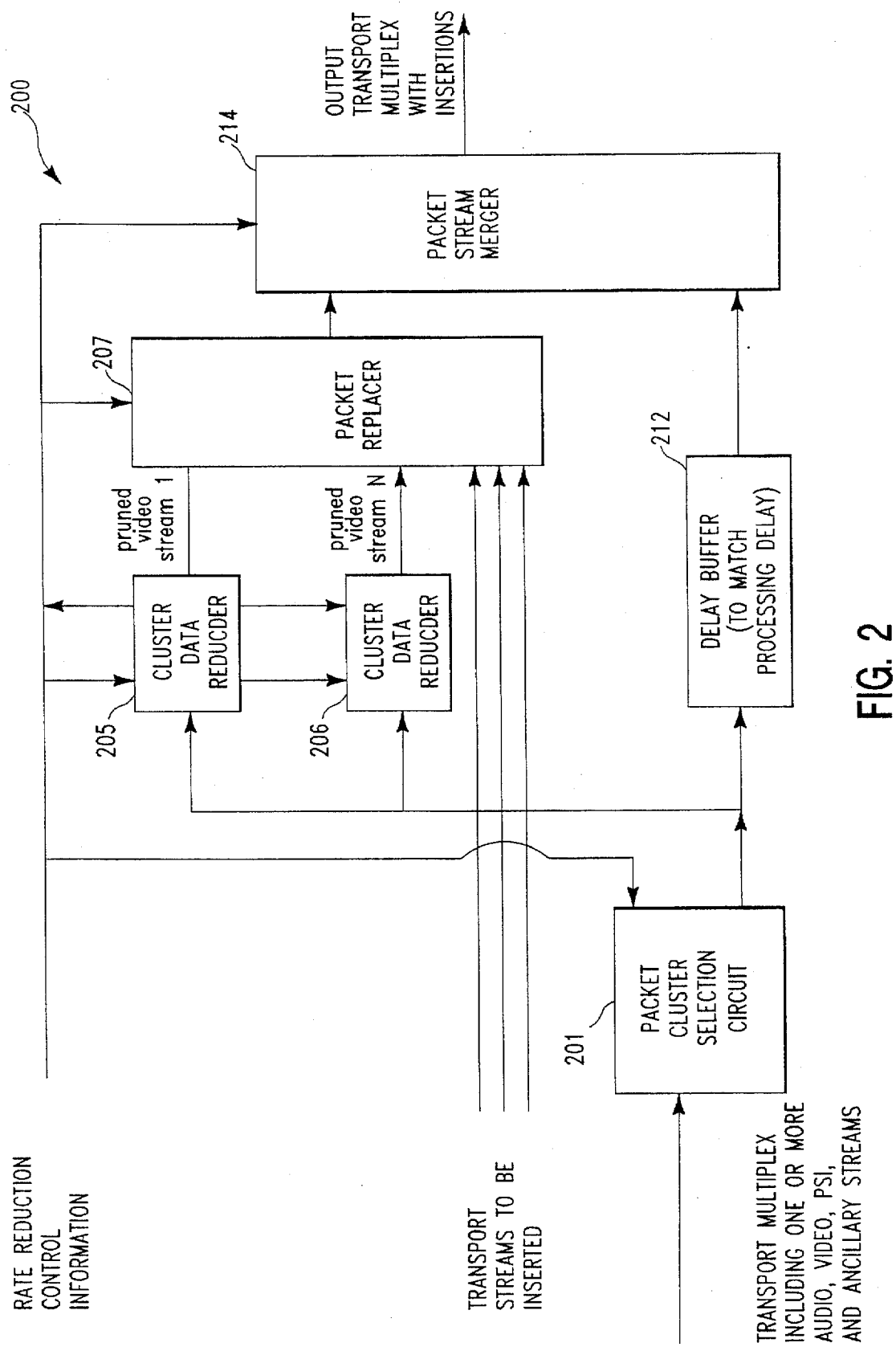
FIG. 2 illustrates a data insertion circuit implemented in accordance with a second embodiment of the present invention.

Referring now to FIG. 2 there is illustrated a data stream processing and insertion circuit 200 implemented in accordance with a second embodiment of the present invention.

The data stream processing and insertion circuit 200 comprises a packet cluster selection circuit 201, a plurality of N cluster data reducer circuits 205, 206, a packet replacer circuit 207, a delay buffer 212, and a packet stream merger circuit 214.

In accordance with the second embodiment of the present invention, a transport multiplex including one or more audio, video, PSI, and ancillary streams is supplied to the packet cluster selection circuit 201. Transport streams to be inserted into the multiplex are supplied to transport stream inputs of the packet replacer circuit 207.

Rate reduction control information, which indicates the reduction in the input transport multiplex data rate that is required for the insertion of the transport stream to be inserted into the transport multiplex is supplied to a control input of the packet cluster selection circuit 201, the packet replacer circuit 207, and the packet stream merger circuit 214. In addition, the rate reduction control information is supplied to each of the N cluster data reducer circuits 205, 206 either directly or indirectly via one of the other cluster data reducer circuits 205, 206. Feedback information is provided to the source of the rate reduction control information from the cluster data reducer circuits 205, 206 so that the rate reduction control information may be dynamicly adjusted as a function of the actual data rate reduction achieved by the cluster data reducer circuits 205, 206.

The packet cluster selection circuit 201 receives the transport multiplex and targets, e.g., selects as a function of the rate reduction control information, packet clusters from one or more streams in the multiplex for data reduction processing. In this context, packet clusters are groups of two or more sequential transport packets of the same elementary data stream in the multiplex. A separate cluster data reducer circuit 205, 206 is provided for each data stream upon which data rate reduction is performed with the cluster data reducer circuit associated with a particular data stream being used to process the packet clusters selected from that particular data stream.

In this manner, packet clusters selected for data reduction processing are sent to one of the N cluster data reducer circuits 205, 206 while the remaining data in the transport multiplex received by the packet cluster selection circuit 201 is supplied to the input of the delay buffer 212. After performing a data reduction operation on a packet cluster, the cluster data reducer circuits 205, 206 output what can be described as a pruned video stream to the packet replacer circuit 207. The packet replacer circuit 207 inserts the transport streams, e.g., the data packets corresponding thereto, which are supplied to the packet replacer circuit 207 into packet locations from which data packets have been deleted as a result of the cluster data reduction operations to generate a stream of packets which is then supplied to the packet stream merger circuit 214.

The delay buffer 212 stores the data received at its input for a period of time corresponding to the time required by the cluster data reducer circuits 205, 206 and the packet replacer circuit 207 to process a packet cluster. The delayed data is then output and supplied to a second input of the packet stream merger circuit 214. In this manner, synchronization, at the packet stream merger circuit 214, is achieved between packet clusters upon which a data rate reduction and data replacement operation has been performed and data packets upon which no data rate reduction operations are performed.

The packet stream merger circuit 214 is responsible for merging the data stream output by the packet replacer circuit 207 and the delay buffer 212 to thereby generate the desired transport multiplex which includes the transport streams which were to be inserted into the original multiplex.

Thus, in the second embodiment, for each targeted data stream, a cluster of consecutive packets for the targeted stream is extracted by the packet cluster selection circuit 201, processed by the cluster data reducer circuit to combine the contents of the cluster packets to thereby replace the processed cluster with a smaller cluster of consecutive packets.

One method which is used, in at least one embodiment of the cluster data reducer circuit 206, for the processing of a pair of consecutive packets extracted from, e.g., a transport packetized video stream, is to replace the first packet of the pair with processed data generated from the contents of both packets in the pair while freeing the second packet to be used for other purposes, e.g, the insertion of packets corresponding to the transport streams which are to be added to the multiplex.

In accordance with the present invention video bits included in a smaller cluster of data packets generated by the cluster data reducer circuit 205, 206, are such that when inserted into the video stream in place of the original cluster from which the smaller cluster was produced, the video stream remains syntactically correct, e.g., MPEG-2 compliant.

In order to maintain MPEG-2 compliance fragments of variable length codes (partial codes) at the beginning and end of the original cluster will normally be retained in the smaller cluster generated by the cluster data reducer circuit 205, 206. In addition, it is generally desirable for all the macroblocks represented by the original cluster to be represented in the smaller cluster. Note that MPEG-2 video coding of P- and B- frames does not require that macroblocks corresponding to these frames be explicitly coded in order to be represented in a data stream. In addition, it is normally not possible to reduce or eliminate any data at the beginning of a cluster before the occurrence of the first slice_start_code included in the cluster. Therefore, in one embodiment cluster data is eliminated only after the occurrence of the first slice_start_code The processing of a cluster for data reduction includes, in one embodiment, parsing the codewords included in the packets of the cluster and eliminating less important codewords. High frequency DCT coefficients are discarded before lower frequency DCT coefficients. Depending on the level of data reduction required, it may be necessary to cause blocks or macroblocks, included in the packets of the cluster being processed, which were originally coded to become uncoded or skipped. It may also be necessary to eliminate motion vectors from the data packets to achieve the desired level of data reduction. As an alternative to eliminating DCT coefficients, requantization with a courser quantizer may be performed, e.g., in the manner described in U.S. patent application Ser. No. 08/340,683.

In one embodiment the cluster data reducer circuits 205, 206 remove data preferentially, with a disproportionately larger amount of the data to be removed being eliminated from B-frames, then from P-frames near the end of a refresh cycle if I-frame refresh is used, then from earlier P-frames and, lastly, from I-frames which are used as anchor frames for, e.g., P- and B- frames.

The second embodiment of the present invention has the advantage over the first embodiment in that depacketization, repacketization and remultiplexing need not be performed. This not only permits simpler implementation, but it also avoids the complexities involved in ensuring that the remultiplexing operation is performed in such a manner so as not to cause data buffer under or over flow due to the changes in the data delivery schedule resulting from the insertion of the additional data into the multiplex.

However, it is expected that the first embodiment of the present invention may offer the opportunity to achieve better picture quality for a fixed rate of inserted data since the data reduction of the targeted video streams can be performed less severely over a much larger span of data then can be achieved by performing data reduction operations on comparatively small clusters of data packets as is expected to be the case in most implementations of the second embodiment of the present invention.

The methods and apparatus of the present invention can be incorporated into systems for distributing compressed video programs with the present invention providing the ability to locally insert data at varying rates without requiring knowledge of this action at the video encoder. Similarly, the methods and apparatus of the present invention can be applied to inserting data into pre-compressed video programs obtained from, e.g., a digital storage media.

What is claimed is:

1. A method of inserting data into an encoded data stream which is a first transport multiplex of a plurality of elementary data streams, the method comprising the steps of:

receiving the encoded data stream;

demultiplexing the encoded data stream to extract one of the individual elementary data streams;

performing a data reduction operation on the extracted one of the individual elementary data stream to generate a first elementary reduced content data streams; and inserting the data into the first elementary reduced content data stream.

2. The method of claim 1, wherein the extracted one of the individual elementary data streams includes a series of data packets; and wherein the data reduction operation is performed on a cluster of at least two sequential data packets in the series of data packets.

3. The method of claim 2 wherein the data reduction operation includes the step of:

combining data included in each of the at least two sequential data packets to form a new data packet.

4. A video processing circuit for inserting data into a first transport multiplex including a plurality of individual streams of compressed data, at least one of the individual streams including digital video data, the video processing circuit comprising:

a demultiplexer for extracting from the first transport multiplex at least one of the individual streams of compressed data included therein;

a first data reduction circuit coupled to the demultiplexer for performing a data reduction operation on the extracted one of the individual streams of compressed data; and a multiplexer coupled to the data reduction circuit and the demultiplexer for generating a second transport multiplex including the data to be inserted.

5. The video processing circuit of claim 4, wherein the data reduction circuit includes:

a depacketizer;

a data reduction device coupled to the depacketizer; and a repacketizer coupled to the data reduction device.

6. The video processing circuit of claim 5, further comprising:

a program status information regenerator circuit coupled to the demultiplexer and multiplexer for generating program status information.

7. The video processing circuit of claim 5, further comprising:

a second data rate reduction device coupled to the demultiplexer and the multiplexer.

8. A processing circuit for inserting data into a first multiplexed data stream formed from a plurality of individual encoded data streams, the processing circuit comprising:

a demultiplexer circuit for extracting from the first multiplexed data stream one of the plurality of individual data streams including clusters of data packets;

a packet cluster selection circuit for receiving the extracted one of the plurality of individual data streams and for selecting clusters of data packets upon which data reduction is to be performed;

a cluster data reducer circuit coupled to the packet cluster selection circuit for eliminating at least one data packet from each selected cluster of data packets; and a packet replacer circuit coupled to the cluster data reducer circuit for replacing the at least one data packet eliminated from each selected cluster of data packets with a data packet including at least a portion of the data to be inserted.

9. The processing circuit of claim 8, further comprising:

a delay buffer coupled to the packet cluster selection circuit for delaying the transmission of packets which are not part of a selected cluster of data packets; and a packet stream merger circuit coupled to the packet replacer circuit and the delay buffer for generating a second multiplexed data stream including the inserted data.

10. The processing circuit of claim 9, wherein the first multiplexed data stream is an MPEG-2 compliant transport multiplex of elementary data streams which include previously encoded and compressed data.

11. A method of processing a first multiplexed data stream formed from a plurality of individual encoded data streams, the method comprising the steps of:

receiving the first multiplexed data stream;

demultiplexing the first multiplexed data stream to extract one of the plurality of individual encoded data streams;

performing a data reduction operation on the extracted one of the individual encoded data streams to generate a first reduced content data stream; and forming a second multiplexed data stream by inserting the additional data into the first reduced content data stream.

12. The method of claim 11, wherein the step of forming the second multiplexed data stream further comprises the step of:

multiplexing the ones of the plurality of individual encoded data streams upon which the data reduction operation was not performed with the first reduced content data stream.

13. The method of claim 12, wherein the first and second multiplexed data streams are MPEG compliant data streams which include previously encoded and compressed data.

* * * * *